United States Patent [19]

Haas et al.

[11] Patent Number: 5,795,607
[45] Date of Patent: Aug. 18, 1998

[54] PROCESS AND DEVICE FOR PRODUCING ROLLED WAFER CONES

[75] Inventors: Franz Haas, Vienna; Johann Haas, Klosterneuburg, both of Austria

[73] Assignee: Franz Haas Waffelmaschinen Industriegesellschaft mbH, Vienna, Austria

[21] Appl. No.: 750,381

[22] PCT Filed: May 29, 1995

[86] PCT No.: PCT/AT95/00108

§ 371 Date: Nov. 25, 1996

§ 102(e) Date: Nov. 25, 1996

[87] PCT Pub. No.: WO95/32630

PCT Pub. Date: Dec. 7, 1995

[30] Foreign Application Priority Data

May 27, 1994 [AT] Austria .................... 1088/94

[51] Int. Cl.⁶ .................................................. A21D 13/08
[52] U.S. Cl. ............... 426/391; 426/443; 426/465; 426/471; 426/496; 426/499; 426/502; 426/503; 426/514; 426/515; 426/518; 99/354; 99/383; 99/443 C
[58] Field of Search .................................. 426/138, 139, 426/143, 144, 279, 280, 282, 283, 391, 443, 465, 471, 496, 499, 501, 502, 503, 514, 515, 518; 99/354, 355, 450.2, 373, 374, 362, 383, 443 C, 356

[56] References Cited

U.S. PATENT DOCUMENTS 2,745,363  5/1956  Balton ................................. 99/355
4,280,402  7/1981  Featherstone ....................... 99/355

FOREIGN PATENT DOCUMENTS 0211356  2/1987  European Pat. Off. .

*Primary Examiner*—Milton Cano
*Attorney, Agent, or Firm*—Herbert L. Lerner; Laurence A. Greenberg; Werner H. Stemer

[57] ABSTRACT

A process and apparatus for producing rolled wafer cones to be filled with ice-cream and frozen for storage. The process comprises pouring dough of high sugar content on an endless, heated baking surface, forming a strip of dough; baking the strip of dough into a thick, strip of wafer; compressing the strip of wafer and at the same time or afterwards, cutting the strip of wafer into individual pieces of wafer; and rolling the pieces of wafer into cones. An apparatus for carrying out the process is also disclosed.

29 Claims, 9 Drawing Sheets

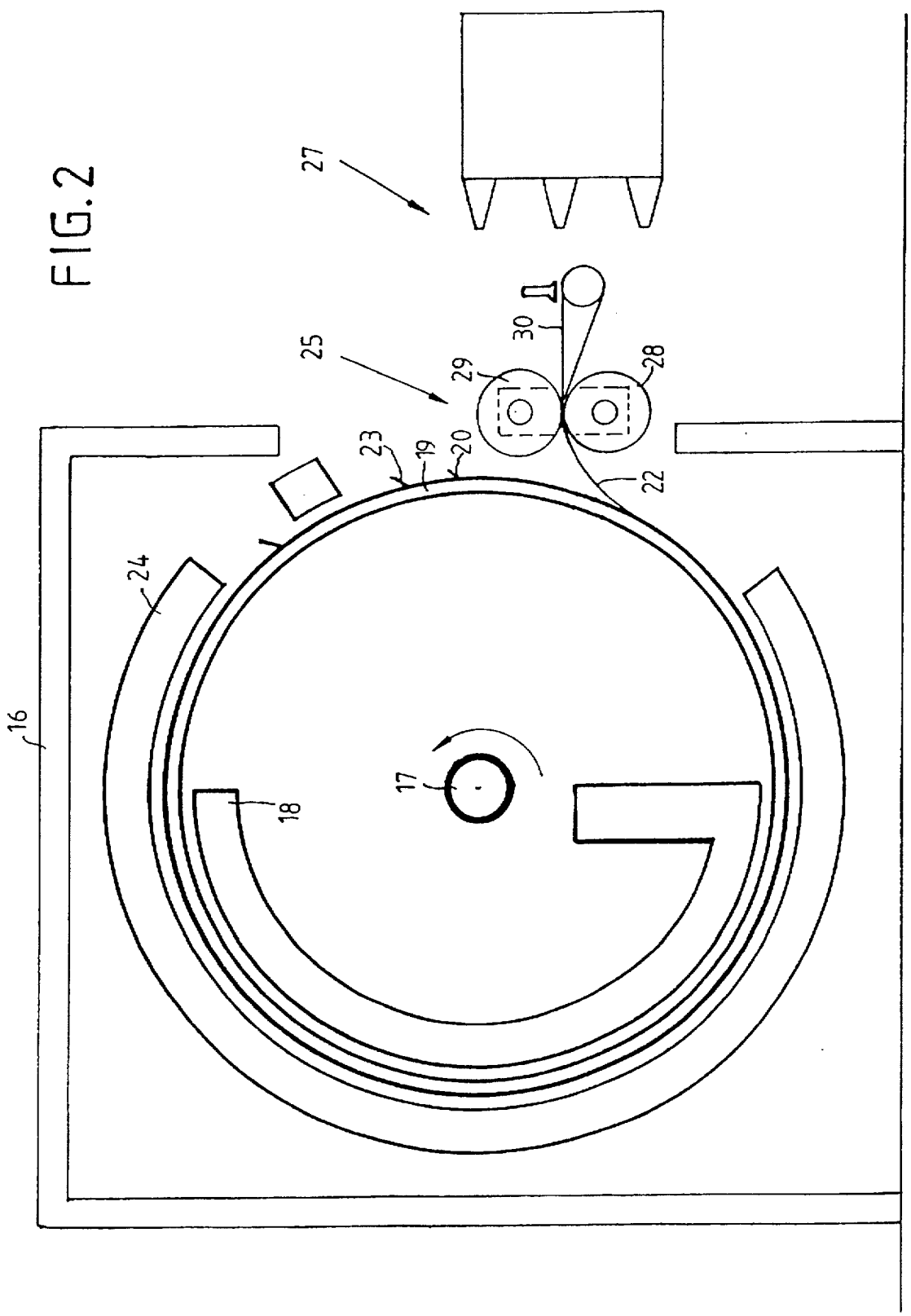

FIG. 8  Main Sketch of the Dough Strip Oven

PROCESS AND DEVICE FOR PRODUCING ROLLED WAFER CONES

BACKGROUND OF THE INVENTION

1. Field of the Invention

Rolled wafer-type ice cream cones are predominantly made today in an automatic wafer baker; on a chain of tongs, a large number of wafer baking tongs, currently already more than 100 of them, after automatically having dough poured on them are guided continuously through a heat oven chamber. After these fan-shaped wafer patties have been baked, the tongs are opened; the baked wafer blank is automatically removed and delivered to a rolling device and rolled up into a cone.

Ice cream cones made in this way are a tasty, crisp wafer confection that after being filled with ice cream is ideally suited for immediate consumption, such as in ice cream parlors or the like.

However, the great majority of rolled wafer cones are filled on an industrial scale with ice cream, then packed, frozen, and stored in a cold storage facility until distributed. At the distributor facility, such products are likewise stored in freezer cabinets and are dispensed from there.

The period of time from the time the wafer cones are filled with ice cream on an industrial scale until they are eaten by the consumer averages several weeks. During this time, because of their porosity, the wafer cones absorb moisture and thereby lose their good taste and above all their crispness.

SUMMARY OF THE INVENTION

The object of the present invention is now to overcome this disadvantage and to furnish a wafer cone for industrial-scale filling with ice cream that tastes good when eaten and has a crispness that is characteristic for wafer products, even after being frozen for several weeks.

According to the process of the invention, this object is attained by the following process steps:

a) a dough with a high sugar content is poured onto an endless, continuously moving, heated baking surface, forming a strip of dough;

b) the dough strip is baked into a thick wafer strip that is preferably from one to several millimeters thick;

c) the baked wafer strip, in its plastically deformable state, is compacted, preferably to a maximum of ⅔ its original thickness, and divided into individual wafer pieces either simultaneously with the compacting or thereafter;

d) the individual wafer pieces are rolled up into cones in the usual way.

Another considerable advantage of the process of the invention is that the production speed can be increased considerably, compared with baking in individual molds.

A variant of the process of the invention provides that the strip of dough is heated on its underside by the endless, continuously moving, heated baking surface for the entire baking time, while its top initially remains unheated for the sake of unhindered outgassing, and it is heated on its top as well, at least in the last quarter of the baking time, in order to brown the top of the dough strip and to make the baked dough strip plastically deformable. The baked dough strip or wafer strip thus produced has a substantially greater density on the underside resting on the heated baking surface and has a practically pore-free surface, since during the baking process the dough strip can easily outgas on its unheated top.

The open pores on the top of the dough strip are closed in the ensuing compacting and embossing. The wafer cones rolled up from the fan-shaped wafer pieces of this baked wafer strip have a substantially greater resistance to the penetration of moisture than rolled wafer cones whose wafer blank, rolled up into a cone, was baked from the same wafer dough with the same dough recipe, but between two heated baking plates as was previously usual.

A variant of the process of the invention provides that the wafer dough is poured in multiple layers in two or more steps.

Pouring on dough in two or more layers produces a dough strip that has fewer pores, since the individual dough layer can more easily outgas because pouring is done in several layers, i.e., the outgassing process of the dough film poured on first is already largely concluded by the time the second dough film is poured on. Moreover, pouring dough in two or more layers also enables a treatment of the baked dough strip for optical effects, for instance two-tone stripes or dots, or the like.

A further variant of the process of the invention provides that the wafer dough is poured into indentations in the moving hot baking surface to form an endless dough strip, the indentations in the baking surface having a peripheral contour that already corresponds to the peripheral contour of the baked wafer pieces produced when the baked wafer strip is divided. In this way, the waste that occurs when the baked wafer strip is divided into the individual baked wafer pieces is markedly reduced.

Another variant of the process of the invention provides that the poured stream of wafer dough for forming an endless strip of dough, which has successive curved portions in its peripheral contours, is moved back and forth crosswise to the direction of motion of the hot baking surface during pouring. In this way, peripheral contours that correspond to the curved edges of the baked wafer pieces to be rolled up into wafer cones can already be realized when dough is poured into the hot baking surface, so that the baked wafer strip can be divided in zig-zag form along the straight edges of these wafer pieces, without significantly wasting baked dough.

Another variant of the process of the invention provides that the thick baked wafer strip is compacted by rolling in its plastically deformable state.

On compacting in the pressing and rolling mechanism, the pores present in the baked strip are closed, i.e., the porous structure of the dough strip is destroyed, so as to obtain a dough strip that is as smooth as possible on the surface and is thus highly moisture-resistant.

A rolling operation can also be integrated directly with the production process of the baked dough strip. The baked strip of dough can either be compacted directly on the baked product carrier, such as a drum, with a roller pressed against the baked product carrier, and not removed from the baked product carrier until it is in the compacted state, or the baked dough strip can be removed from the baked product carrier and compacted continuously in a compacting station that for instance comprises a pair of rollers.

Another variant of the process of the invention provides that the thick baked wafer strip is compacted by rolling embossing in its plastically deformable state, and is divided into the individual baked, substantially flat wafer pieces.

Thus in one operation, the baked dough strip is made less porous by compacting, and at the same time the waffle pattern, a name or mark, is impressed in the dough strip, and the strip of dough is divided into pieces of the proper shape, the edges being trimmed in the process.

The process of the invention can also be applied to the production of wafer rolls, deep-drawn wafer cups, wafer dishes, and the like, for industrial-scale filling with ice cream and storage in the frozen state.

The wafer dough used in the process of the invention preferably contains from 25 to 100 weight % of sugar, referred to the proportion of flour (starch). The baking time is advantageously from 180 to 360 seconds, and the baking temperature is advantageously approximately 150° to 210° C.

Several baking tests are summarized below in table form:

| Test | I | II | III | IV | V |
|---|---|---|---|---|---|
| Flour | 100 | 100 | 100 | 100 | 100 |
| Sugar | 20 | 60 | 40 | 60 | 50 |
| Fructose | 5 | — | — | — | — |
| Salt | 0.3 | — | — | 0.5 | — |
| Powdered milk | 2 | — | — | — | 1 |
| Whey | 6 | 6 | 5 | 6 | 6 |
| Oil | 5 | 6 | 6 | 5 | 3 |
| Water | 95 | 87.5 | 98.0 | 85.0 | 90 |
| Starch | — | — | — | 10 | 10 |
| Baking time (s) | 205 | 240 | 200 | 240 | 200 |
| Baking temperature (°C.) (baking drum) | 195 | 165 | 175 | 165 | 170 |

| Test | VI |
|---|---|
| Flour | 100 |
| Sugar | 50 |
| Fructose | — |
| Salt | — |
| Powdered milk | — |
| Soy flour | 6 |
| Oil | 5 |
| Water | 105 |
| Starch | 10 |
| Baking time (s) | 360 |
| Baking temperature (°C.) | 160 |

The present invention also includes apparatuses for performing the processes described above. They will be described below in conjunction with the drawings.

BRIEF DESCRIPTION OF THE DRAWINGS

The drawings show:

FIG. 2, schematically, a side view of a second embodiment of a system, equipped with a baking drum, for producing rolled wafer cones;

DESCRIPTION OF EXEMPLARY EMBODIMENTS

Figure 1:
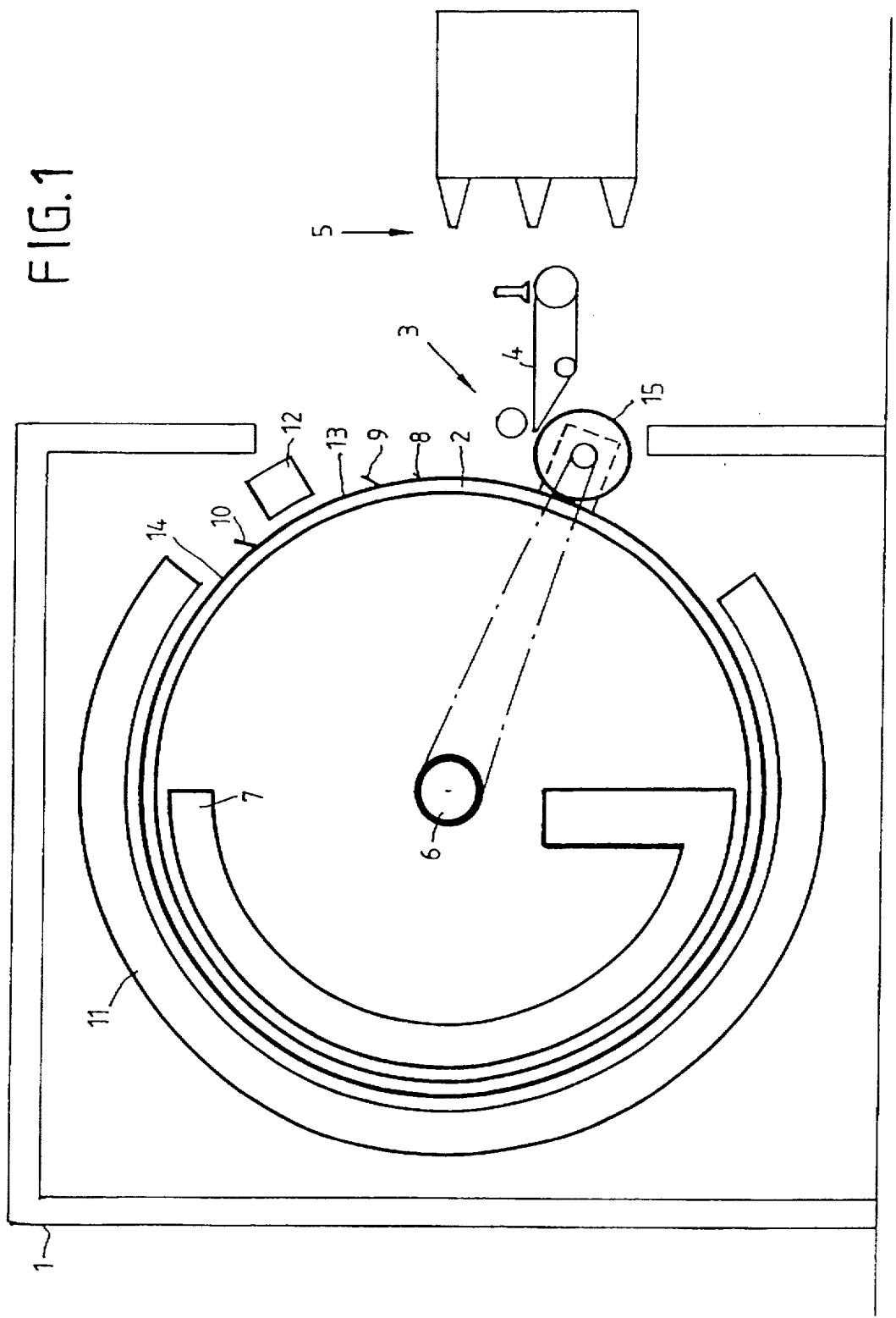
FIG. 1, schematically, a side view of a first embodiment of a system, equipped with a baking drum, for producing rolled wafer cones.

The embodiment shown in FIG. 1 of a system according to the invention equipped with a baking drum, for producing rolled wafer cones, has a baking apparatus 1 for producing a thick, endless, plastically deformable, baked wafer strip; it includes a baking drum 2 and a handling station 3, cooperating directly with the baking drum, for the baked wafer strip, in which the baked wafer strip is compacted in its plastically deformable state on the baking drum 2 and divided into individual wafer pieces. These wafer pieces are transferred, via a conveyor belt 4, to a processing station 5 downstream of the handling station 3; in the processing station, the individual wafer pieces are reshaped, in their plastically deformable state, from their substantially flat form into the different, three-dimensional cone-shaped form, with the aid of the rolling device that is only schematically shown.

The baking drum 2 of the baking apparatus 1 rotates slowly about a substantially horizontal rotary axis 6 and is heated from inside by an internal heater 7 extending along the circumference of the drum. The baking drum 2, with its smooth outer surface, forms a continuously moving, heated baking surface 8 for the wafer dough. The wafer dough is poured onto the heated baking surface 8 of the baking drum 2 in the region of the upper half of the drum, located above the rotary axis 6, by means of a front dough pouring device 9 adjacent to the front crest of the drum.

If pouring the wafer dough on twice or more is provided for, in order to attain the desired thickness of the dough strip, then the front dough pouring device 9 is part of a pouring path that extends in the direction of rotation of the baking drum 2 and includes two or more dough pouring devices; its second dough pouring device 10 is disposed behind the front dough pouring device 9, in terms of the direction of rotation of the baking drum 2.

Along the baking surface 8, following the front dough pouring device 9 in the direction of rotation of the baking drum 2, a heated baking path is provided, which extends on the outside all the way around the baking drum 2 and includes an outer heater 11, for instance provided with infrared radiant heaters, for heating the endless dough strip resting on the baking surface 8 of the baking drum 2. The heater 11 extends from the front dough pouring device 9 to near the handling station 3 which cooperates directly with the baking drum 2 and in which the baked wafer strip is compacted and divided into the individual wafer pieces.

If pouring of the wafer dough twice or more is contemplated in order to attain the desired thickness of the dough strip, then the heated baking path overlaps the pouring path, and infrared heat radiators 12 are also disposed between the individual dough pouring devices 9 and 10.

To produce a thick, endless, plastically deformable wafer strip, a wafer dough with high sugar content is prepared from the ingredients of the wafer dough, and with the aid of the dough pouring device 9, a layer of dough 13 is poured onto the heated baking surface 8 of the baking drum 2. This layer of dough 13, sticking to the baking surface 8, is baked on the baking surface 8 during rotation of the baking drum 2, to form an endless, plastically deformable wafer strip, which is transported on the baking surface 8 in the plastically deformable state as far as the handling station 3 disposed in the region of the front crest of the drum. In that station, the baked wafer strip is compacted and embossed by means of a forming or embossing roller 15 cooperating with the baking drum 2, the latter acting as a counter roller, and is simultaneously divided into individual wafer pieces, which are transferred to the conveyor belt 4.

Figure 3:
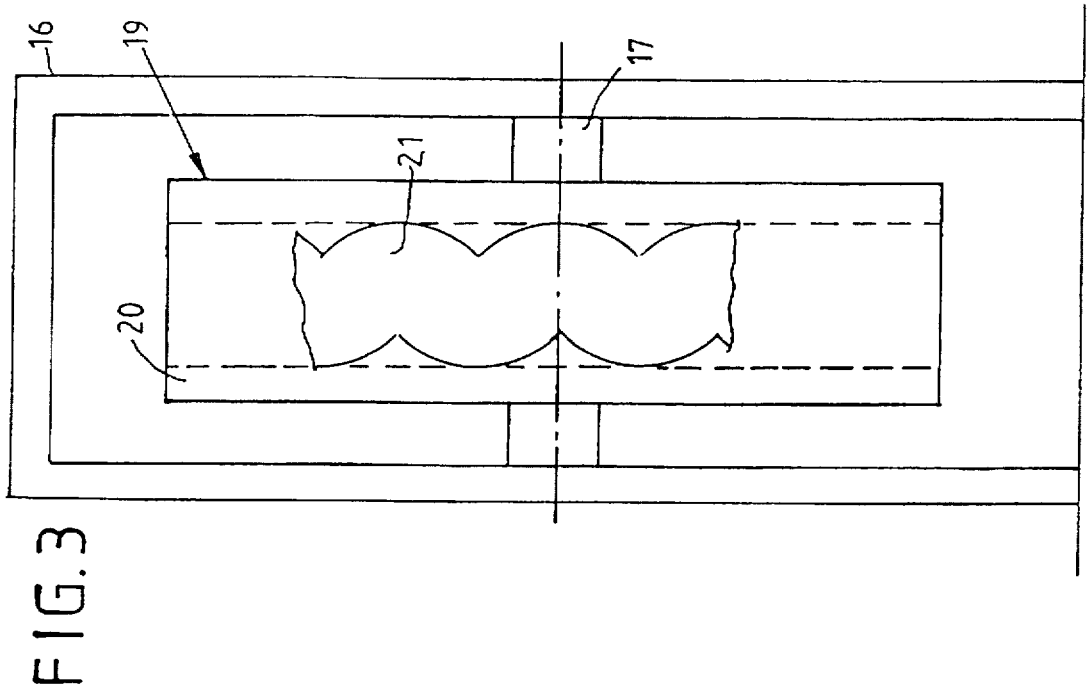
FIG. 3, schematically, a front view of the baking drum of the system of FIG. 2, shown extended widthwise for the sake of clearer illustration.
Figure 4:
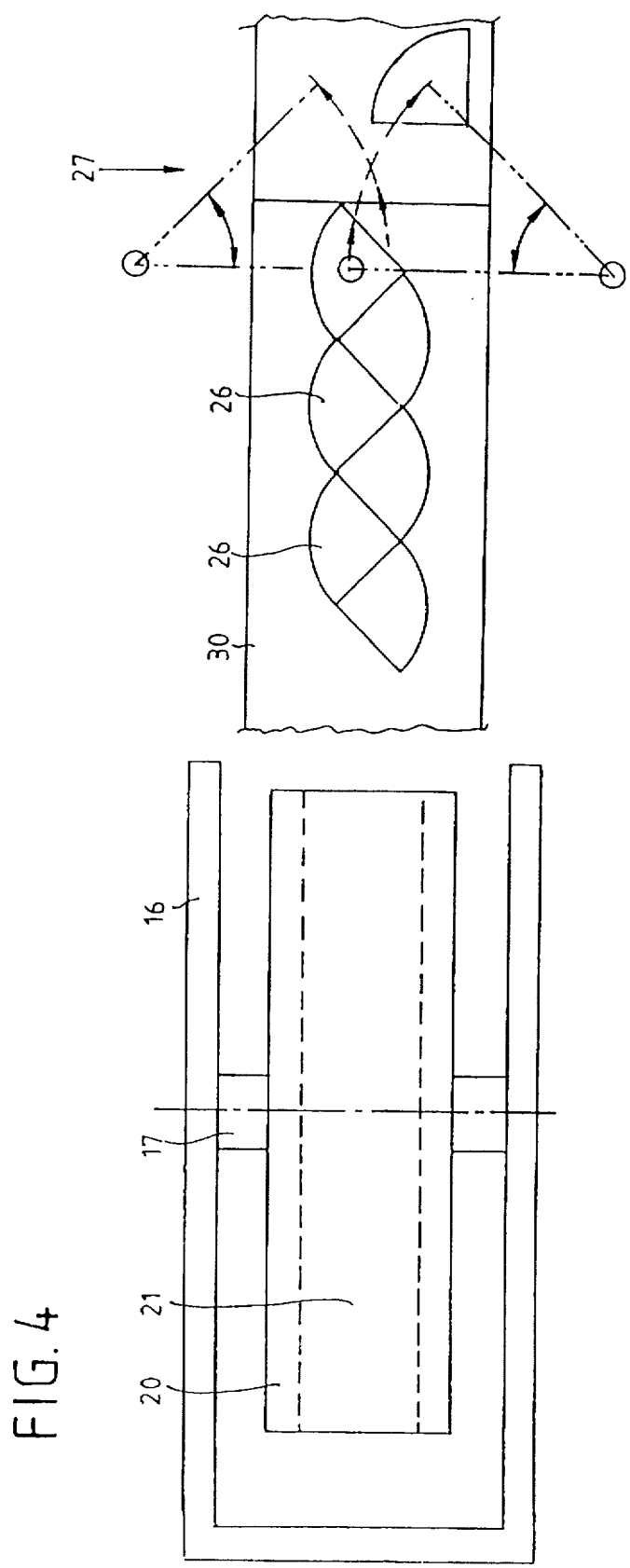
FIG. 4, schematically, a plan view on the system of FIG. 2 extended widthwise for the sake of clearer illustration, in which only the baking drum and the wafer pieces that have emerged from the handling station and have yet to be rolled up are shown on a conveyor belt.

FIGS. 2–4 show a further exemplary embodiment of a system, equipped with a baking drum, for performing the process of the invention. This system has a baking apparatus 16, with a baking drum 19 that rotates about a horizontal rotary axis 17 and is heated by an internal heater 18; an endless flat indentation 21 extending over the circumference of the drum is let into the outer surface 20 of this drum, and its shape corresponds to the endless strip formed by the fan-shaped wafer pieces, lined up without gaps between one another, that are to be rolled up. This outer surface 20, provided with the flat indentation 21, of the baking drum 19 forms a continuously moving, heated baking surface for the wafer dough, which is baked in this indentation 21 of the baking drum 19 into an endless, plastically deformable wafer strip 22, whose side edges are provided with curved portions corresponding to the curved edges of the fan-shaped wafer pieces that are to be rolled up.

In the baking apparatus 16, the wafer dough is poured, in the region of the upper half of the drum located above the rotary axis 17 of the baking drum 19, by means of a dough pouring device 23, onto the heated baking surface 20 provided with the flat indentation 21, producing a dough strip which is provided with side edges shaped to correspond to the curved edges of the wafer pieces to be rolled up. Along the baking surface 20, downstream of the dough pouring device 23 in the direction of rotation of the baking drum 19, a heated baking path 24 is provided, which is formed by a heater extending all the way around the outside of the baking drum 19 as far as the vicinity of the front crest of the drum; by way of example, this heater contains a plurality of spaced-apart infrared radiators for heating the endless strip of dough located in the indentation 21 of the baking surface 20.

To produce an endless, plastically deformable wafer strip provided with curved peripheral portions, a wafer dough with a high sugar content is poured out by the dough pouring device 23 into the indentation 21 in the heated baking surface 20 of the rotating baking drum 21 in a dough layer 13 up to 3 mm thick. During the rotation of the baking drum 19, this layer of dough up to 3 mm thick is baked into an endless, plastically deformable wafer strip 22, which is removed in the plastically deformable state in the region of the front crest of the drum and delivered to a handling station 25, downstream of the baking apparatus, and in this station the baked wafer strip is compacted in its plastically deformable state and divided into individual baked, essentially flat, fan-shaped wafer pieces 26. The handling station 25 is followed immediately by a processing station 27, in which the individual fan-shaped wafer pieces 26 that are to be rolled up are converted from their essentially flat form into the different, three-dimensional, cone-like form, with the aid of two rolling devices, shown only schematically in side view in FIG. 2.

In the handling station 25, the baked endless wafer strip 22, provided with curved peripheral portions, is compacted and embossed in its plastically deformable state by means of a forming or embossing roller 29, which cooperates with a counter roller 28, and at the same time is divided into individual, fan-shaped wafer pieces 26 and transferred to a downstream conveyor belt 30, on which the fan-shaped wafer pieces 26 are carried, with their respective straight peripheral edges laterally next to one another, to the processing station 27; each fan-shaped wafer piece 26 rests on the conveyor belt 30 with its point between the curved peripheral edges of the two fan-shaped wafer pieces next to it on either side (FIG. 4).

Figure 6:
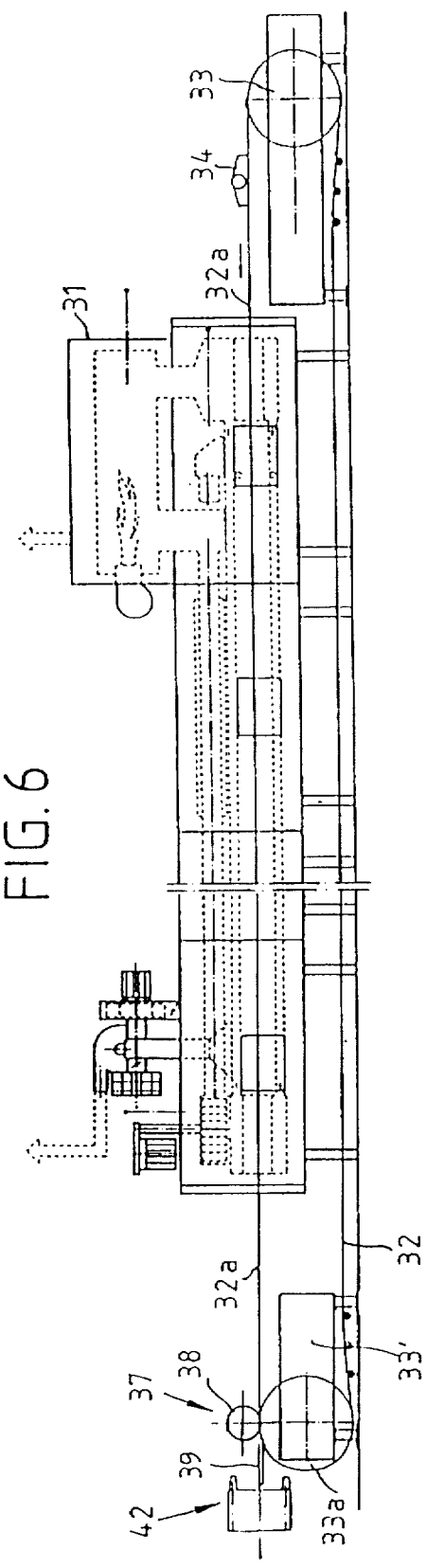
FIG. 6, schematically, a side view of a system, equipped with a continuous or once-through oven for producing rolled wafer cones.
Figure 7:
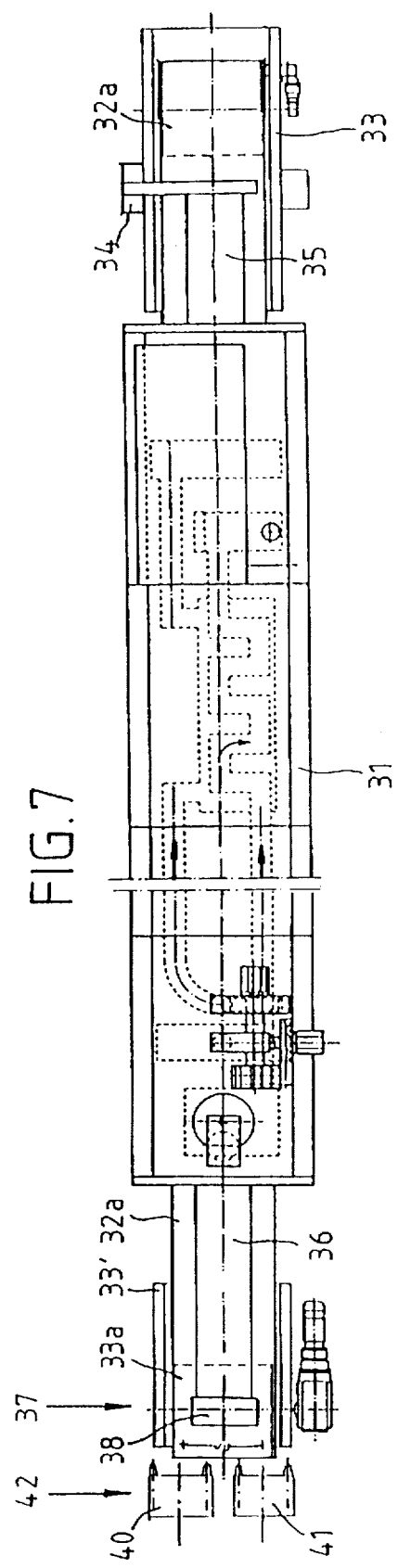
FIG. 7, a plan view on FIG. 6.
Figure 8:
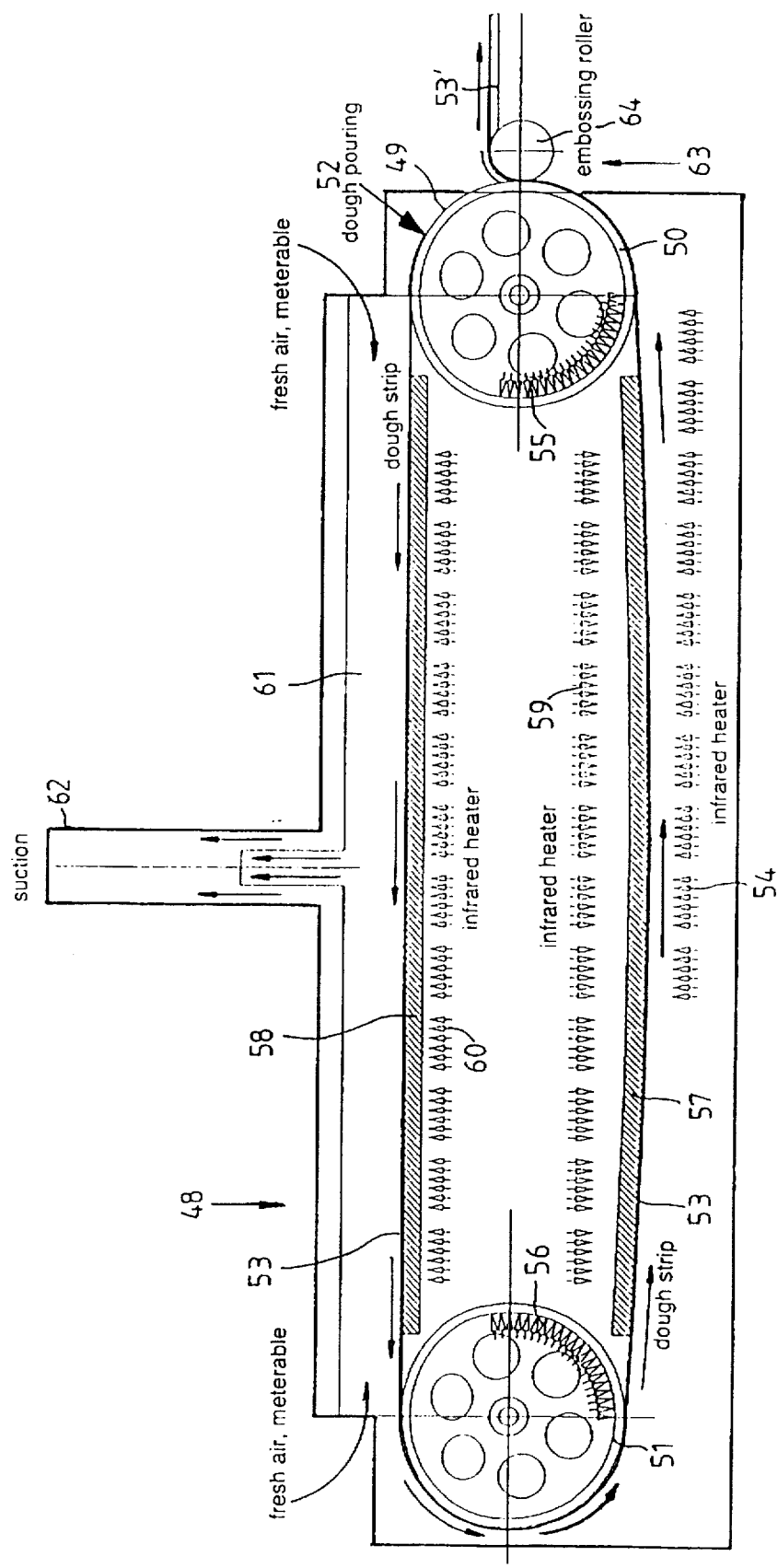
FIG. 8 schematically shows a side view of a system, provided with a baking oven and an endless baking belt guided over two deflection drums, for producing rolled wafer cones.
Figure 9:
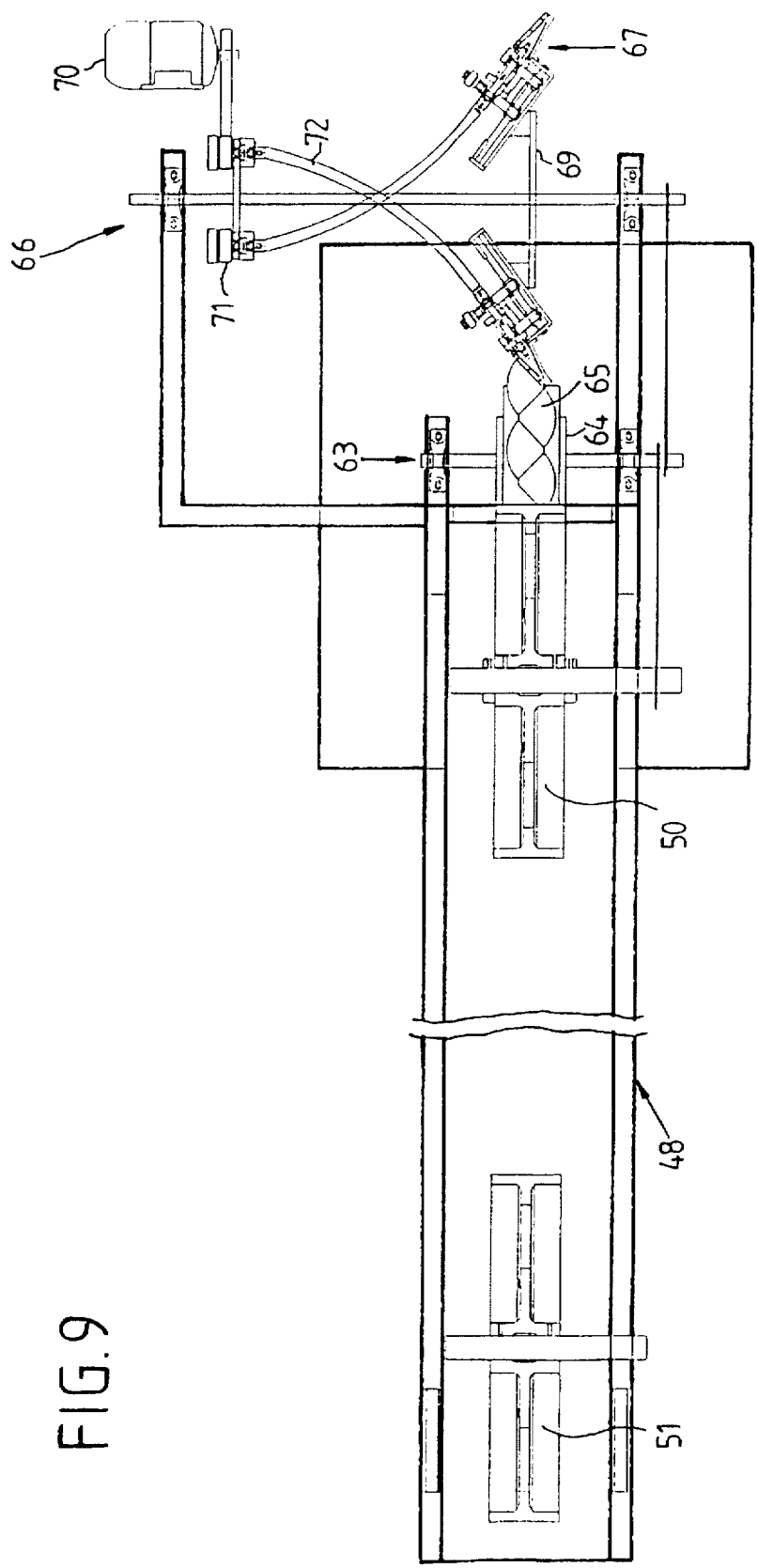
FIG. 9, a plan view of the system of FIG. 8.
Figure 10:
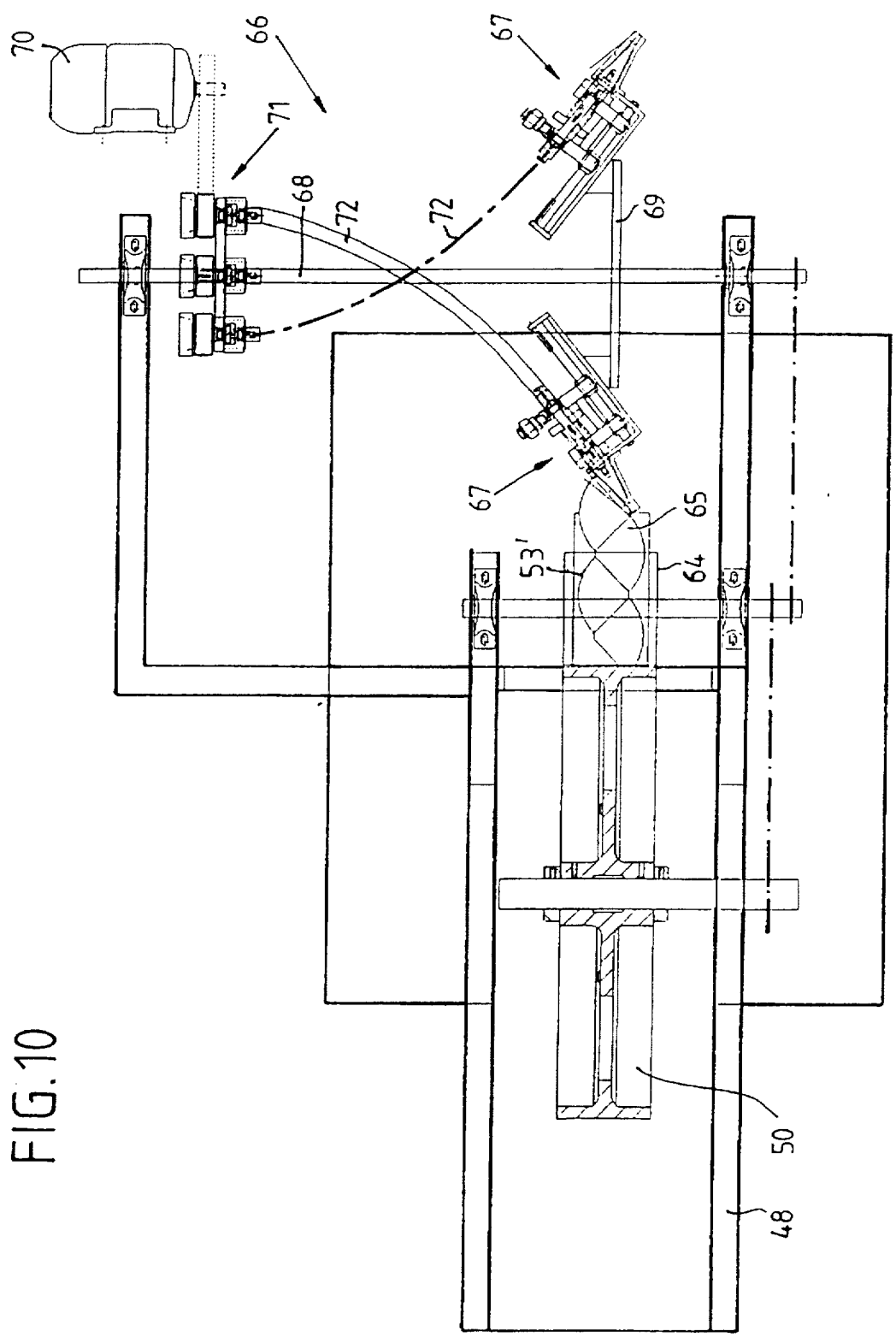
FIG. 10, a plan view of the front end of the system of FIG. 8.
Figure 11:
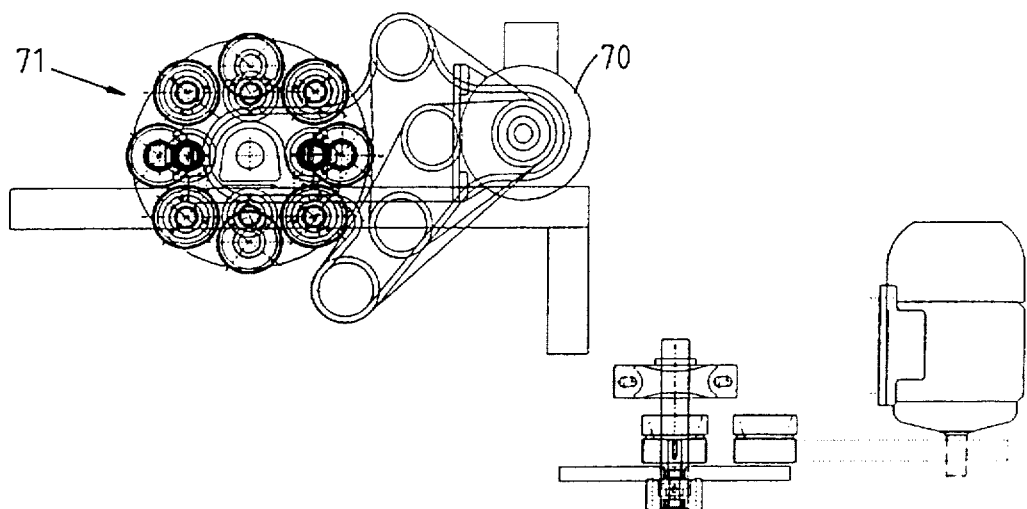
FIG. 11, an end view of the rolling device of the system of FIG. 8.

FIGS. 6 and 7 show a further exemplary embodiment of a system for performing the process of the invention. This system is equipped with a continuous, or once-through, oven 31 with an endless baking belt 32, the upper run 32a of which is passed through the continuous oven 31 and is deflected at deflection stations 33, 33' located outside the continuous oven 31. In this system, the wafer dough is poured by a pouring device 34, embodied as a pouring tube, near the deflection stations 33 onto the upper run 32a, forming an endless, moving baking surface, of the endless baking belt 32 to form an endless dough strip 35, which on passing through the continuous oven 31 is baked into a thick, endless, plastically deformable, flat wafer strip. The upper run 32a of the endless baking belt 32 transports the baked wafer strip 36 to a handling station 37 which includes an embossing or stamping device; this device cooperates with the upper run 32a of the endless baking belt 32 and includes a forming or embossing roller 38, which cooperates with the preferably heated deflection roller 33' of the baking belt 32 acting as a counter roller and disposed in the deflection station 33' of the baking belt 32, and which compacts the baked, flat wafer strip 35 resting in the plastically deformable state on the upper run 32a of the endless baking belt 32 and divides it into individual baked wafer pieces or wafer patties, which are located side by side in the transporting plane of the upper run 32a of the baking belt 32.

Once the baked wafer strip has been divided by the embossing or stamping device into individual, fan-shaped wafer pieces or wafer patties, these pieces or patties rest with their straight peripheral edges laterally next to one another, with the point of each fan-shaped wafer piece next to the curved peripheral edge of the adjacent fan-shaped wafer piece.

The handling station 37 is followed by a transfer device 39, which takes the individual baked wafer pieces, in the plastically deformable state, in the arrangement in which they emerge from the forming or embossing roller 38 and transfers them to a processing station 42 that is provided with two rolling mechanisms 40, 41 for rolling up the wafer pieces into cones.

Figure 5:
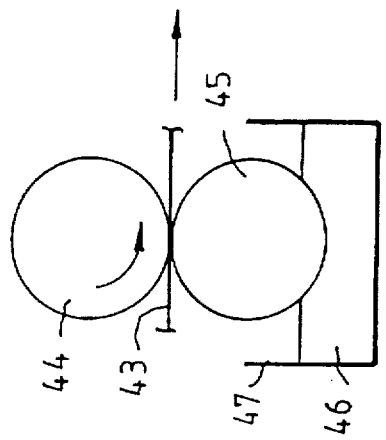
FIG. 5, schematically, a cross section through a further embodiment of a handling station.

FIG. 5 shows a handling station for the baked, endless wafer strip 43; it has an upper embossing and stamping-out roller 44 and a lower counter roller 45, which plunges into an oil bath 46 in an oil pan 47 and applies a thin film of edible oil on the underside of the wafer strip 43 or of the wafer pieces stamped out of the wafer strip.

FIGS. 8–11 show another exemplary embodiment of a system for performing the process of the invention. This system includes an elongated baking oven 48, in whose interior an endless baking belt 49 revolves around a front deflection drum 50 and a rear deflection drum 51. The endless baking belt 49, with its smooth outer surface, forms a continuously moving baking surface, onto which, in the region of the upper half of the front deflection drum 50, liquid wafer dough is poured out by a dough pouring device 52, shown only symbolically, into a thick, endless strip of dough 53, which is heated on its underside over its entire length by the heated baking belt 49 (from below) and is also heated on its exposed top by infrared heaters 54 along the lower run of the baking belt. For heating the baking belt 49, the two deflection drums 50, 51 are each provided with an infrared or gas burner heater 55, 56 acting on the jacket of the drum from the inside, and between the two deflection drums, radiant heaters 57, 58 adapted to the lane of the baking belt 49 are provided, each of them heated by infrared or gas burner heaters 59, 60 disposed on their back side.

Above the upper run of the baking belt 49, a conduit 61 is provided, shielded from the oven gases and communicating with the oven vent 62. The temperature in the conduit 61 is kept so cool that outgassing of the dough strip 53 on its exposed top is possible, and premature formation of a skin on the exposed top of the dough strip 63, which would hinder the outgassing, is averted. To reinforce the outgassing, fresh air can be supplied to the conduit 61 on its front and/or rear end.

The dough strip 53 is baked in the oven 48 to a thick, endless, plastically deformable wafer strip, which emerges from the oven 48 in the plastically deformable, warm state and enters an embossing station 63 immediately downstream of the oven. In this station, the baked, plastically deformable wafer strip is compacted by an embossing roller 64, causing plastic deformation of the wafer strip, and is removed from the heated baking belt 49. By means of the embossing roller 64, the baked dough or wafer strip 53' is provided with a waffle pattern and with continuous parting lines that define the individual wafer pieces on their outline, and the thick wafer strip is practically severed along the parting lines. Along with the flat, circular-sector or fan-shaped wafer pieces 65 for the wafer cones, this produces substantially triangular edge pieces as well. Next, in the downstream rolling station 66 (FIG. 9), the substantially flat, circular-sector or fan-shaped wafer pieces 65 are rolled up into wafer cones, while the flat, substantially triangular edge pieces are further processed, outside the system of the invention, as flat wafer pieces.

The fan-shaped wafer pieces 65 severed from the wafer strip 53' by the embossing roller 64 are, arranged successively in mirror symmetry to one another, and they are delivered, aligned accurately, to the respective cone winder 67 in the rolling device disposed in the rolling station 66. The cone winders 67 are distributed evenly about the rotary axis 68 of the rolling device along the circumference of a turntable 69; adjacent winders 67 are likewise arranged in mirror symmetry to one another, corresponding to the mirror-symmetrically arranged fan-shaped wafer pieces 65. About the essentially horizontal rotary axis 68, which is perpendicular to the direction of transport of the wafer pieces, the turntable 69 is rotated as a function of the speed of revolution of the baking belt 49. The winders 67 are driven by a motor 70 via a gear head 71 and by flexible drive shafts 72 leading away from the gear head.

Figure 12:
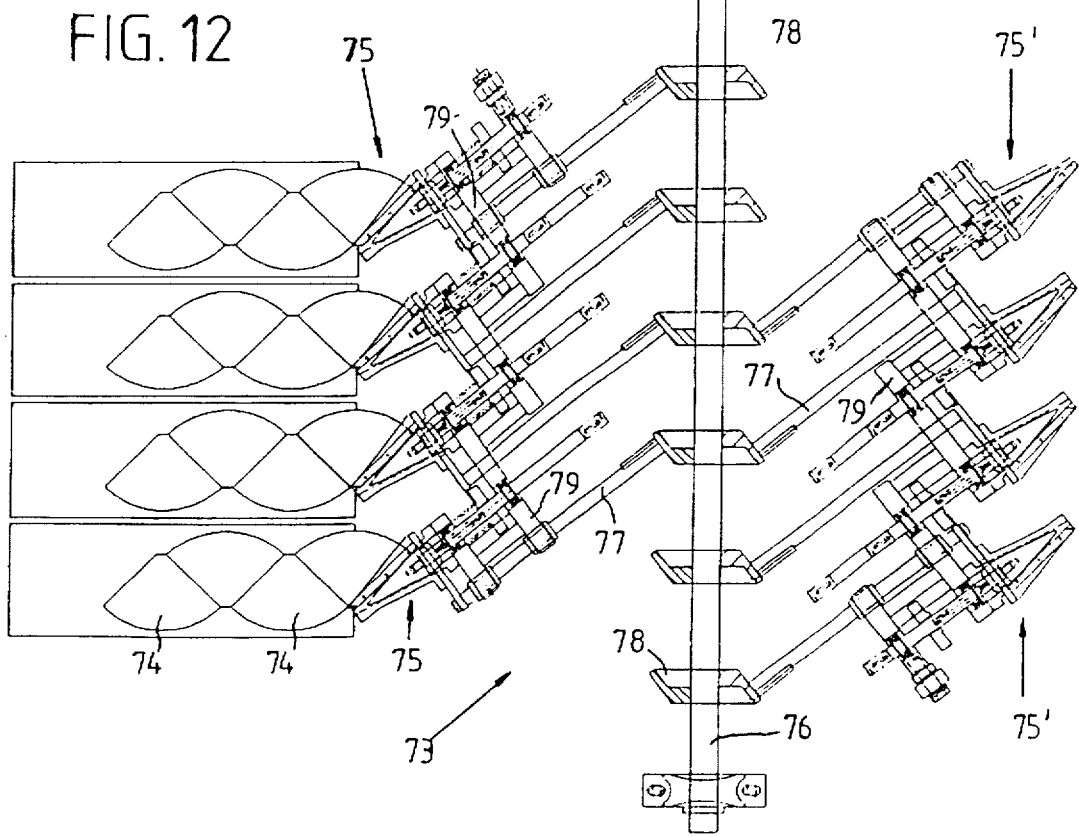
FIG. 12, schematically, an embodiment of a rolling device for a four-lane system for producing rolled wafer cones.

FIG. 12 schematically shows a roller device 73 for four baked strips of dough or wafer strips disposed side by side; the strips are divided by embossing rollers, not shown, into fan-shaped wafer pieces 75, which are rolled up into wafer cones by the cone winders 75, 75'. The cone winders 75, 75' are distributed evenly around the rotary axis 76 of the rolling device 73, about its circumference. Adjacent winders 75, 75' are likewise arranged in mirror symmetry to one another, corresponding to the mirror-symmetrically arranged fan-shaped wafer pieces 74, and depending on the number of winders distributed about the circumference are offset from one another by 45 or 90 degrees. In FIG. 12, the winders 75' in mirror symmetry with the winders 75 are shown opposite the latter, for the sake of clearer illustration. Each winder 75, 75' associated with one wafer strip is connected via its own support rod 77 to a hub 78, rotatably supported on the rotary axis 68, to which all the other winders 75, 75' associated with the same wafer strip are also connected. In addition, the winders 75, 75' of the rolling device that are associated with adjacent wafer strips and are disposed in the same radial plane are each joined to one another by a crossbar 79.

We claim:

1. A process for producing rolled wafer cones for industrial-scale filling with ice cream and storage in the frozen state, the process which comprises:
    a) pouring dough with a high sugar content onto an endless, continuously moving, heated baking surface, and forming a strip of dough;
    b) baking the strip of dough into a thick wafer strip;
    c) compacting the baked wafer strip, in a plastically deformable state thereof, and dividing the baked wafer strip into individual wafer pieces; and
    d) rolling the individual wafer pieces into wafer cones.

2. The process according to claim 1, wherein the baking step comprises baking the strip of dough into a wafer strip having a precompaction thickness of at least one millimeter; and the compacting step comprises compacting the baked wafer strip to a maximum of two thirds the precompaction thickness thereof.

3. The process according to claim 1, wherein the dividing step is performed simultaneously with or subsequently to the compacting step.

4. The process according to claim 1, wherein the baking step comprises heating the dough strip on an underside thereof with the endless, continuously moving, heated baking surface for the entire baking time, while a top thereof initially remains unheated for unhindered outgassing, and subsequently heating the top of the dough strip, at least within a last quarter of baking time, in order to brown the top of the dough strip and to render the baked dough strip plastically deformable.

5. The process according to claim 1, wherein the pouring step comprises pouring liquid wafer dough containing from 25 to 100% by weight of sugar.

6. The process according to claim 1, wherein the pouring step comprises pouring the wafer dough in multiple layers in a plurality of steps.

7. The process according to claim 1, which further comprises forming the heated baking surfaces with indentations having a peripheral contour corresponding to a peripheral contour of the baked wafer pieces produced in the dividing step, and wherein the pouring step comprises pouring the wafer dough into the indentations in the moving heated baking surface to form the endless strip of dough.

8. The process according to claim 1, wherein the pouring step comprises pouring the wafer dough in a stream of wafer dough, and moving the stream of wafer dough back and forth crosswise to a direction of motion of the heated baking surface, such that the endless strip of dough has successive curved portions at peripheral contours thereof.

9. The process according to claim 1, wherein the compacting step comprises rolling the thick baked wafer strip in the plastically deformable state thereof.

10. The process according to claim 1, wherein the compacting step comprises roller embossing the thick baked wafer strip in the plastically deformable state thereof.

11. The process according to claim 10, which further comprises providing an embossing roller with raised portions and the roller embossing step comprises compacting essentially only with the raised portions of the embossing roller.

12. The process according to claim 1, which further comprises embossing a pattern on the wafer strip simultaneously with the compacting step.

13. The process according to claim 1, which comprises performing the compacting step at a temperature which is approximately equivalent to a baking temperature in the baking step.

14. The process according to claim 1, which comprises producing wafer rolls for industrial-scale filling with ice cream and storage in a frozen state.

15. The process according to claim 1, which comprises producing one of deep-drawn wafer cups and wafer dishes for industrial-scale filling with ice cream and storage in a frozen state.

16. An apparatus for producing rolled wafer cones for industrial-scale filling with ice cream and storage in the frozen state, comprising:

a production station for producing individual, substantially flat, baked wafer pieces being plastically deformable in a state in which the wafer pieces are warm from baking, said production station including an endless, continuously moving, heating baking surface for producing an endless, thick, baked wafer strip; at least one dough pouring device, one heated baking path, and one removal device are disposed in succession along a path defined by said baking surface in a travel direction of said baking surface, said production station further including a handling station for the baked wafer strip, in which the baked wafer strip is compacted and divided into the individual baked wafer pieces; and a processing station for receiving the baked wafer pieces from said production station in the state in which the wafer pieces are warm from baking, said processing station including at least one rolling device for rolling up the wafer pieces.

17. The apparatus according to claim 16, wherein said handling station for the baked wafer strip is disposed downstream of the heated baking path along the path of the moving baking surface in the travel direction of said baking surface.

18. The apparatus according to claim 17, including a removal device for delivering the individual wafer pieces from said handling station to said processing station, said removal device being integrated with the processing station for the wafer pieces.

19. The apparatus according to claim 16, including a removal device for delivering the individual wafer pieces from said handling station to said processing station, said handling station for the baked wafer strip being between said removal device and said processing station for the wafer pieces.

20. The apparatus according to claim 16, wherein said baking surface has indentations formed therein successively in the travel direction of the baking surface, a three-dimensional form of each of said indentations corresponding to a form of the wafer pieces to be rolled up.

21. The apparatus according to claim 16, wherein said handling station includes an embossing roller which is supported so as to be capable of being brought into contact with a top of the baked wafer strip and a counter roller which is supported so as to be capable of being brought into contact with an underside of the baked wafer strip.

22. The apparatus according to claim 21, wherein said counter roller is an oiling roller for the underside of the wafer strip or of the wafer pieces, respectively.

23. The apparatus according to claim 21, wherein said embossing roller is formed with cutting edges corresponding to a shape of the wafer pieces.

24. The apparatus according to claim 21, wherein said embossing roller is formed with a waffle embossing pattern.

25. The apparatus according to claim 16, wherein said handling station includes an embossing roller which is supported so as to be capable of being brought into contact with a top surface of the baked wafer strip while an underside of the baked wafer strip is supported on said endless baking surface.

26. The apparatus according to claim 25, wherein said embossing roller is formed with cutting edges corresponding to a shape of the wafer pieces.

27. The apparatus according to claim 25, wherein said embossing roller is formed with a waffle embossing pattern.

28. The apparatus according to claim 16, including a pouring path partly overlapping said heated baking path, and at least two dough pouring devices disposed in succession in the travel direction of said baking surface.

29. The apparatus according to claim 28, wherein said heated baking path includes infrared radiant heaters disposed between mutually adjacent said dough pouring devices.

* * * * *